(12) United States Patent
Park

(10) Patent No.: US 7,330,356 B2
(45) Date of Patent: Feb. 12, 2008

(54) CASE OF MOBILE TERMINAL

(75) Inventor: Jin-Soo Park, Seoul (KR)

(73) Assignee: LG Electronics Inc., Seoul (KR)

( * ) Notice: Subject to any disclaimer, the term of this patent is extended or adjusted under 35 U.S.C. 154(b) by 391 days.

(21) Appl. No.: 11/013,799

(22) Filed: Dec. 17, 2004

(65) Prior Publication Data

US 2005/0136969 A1   Jun. 23, 2005

(30) Foreign Application Priority Data

Dec. 20, 2003   (KR) .................... 10-2003-0094297

(51) Int. Cl.
*H05K 7/20* (2006.01)
(52) U.S. Cl. ...................... 361/720; 361/688
(58) Field of Classification Search ........... 361/688, 361/720
See application file for complete search history.

(56) References Cited

U.S. PATENT DOCUMENTS

| | | | | |
|---|---|---|---|---|
| 4,481,382 A | * | 11/1984 | Villa-Real | 455/556.1 |
| 4,858,071 A | * | 8/1989 | Manabe et al. | 361/720 |
| 4,905,123 A | * | 2/1990 | Windle et al. | 361/710 |
| 5,930,115 A | * | 7/1999 | Tracy et al. | 361/704 |
| 6,672,370 B2 | * | 1/2004 | Searls et al. | 165/10 |
| 2001/0050844 A1 | * | 12/2001 | Egawa | 361/720 |
| 2005/0117300 A1 | * | 6/2005 | Prasher et al. | 361/699 |

FOREIGN PATENT DOCUMENTS

| | | |
|---|---|---|
| EP | 0 391 020 A1 | 10/1990 |
| EP | 0658030 A1 | 6/1995 |
| FR | 2 731 133 A1 | 8/1996 |

OTHER PUBLICATIONS

European Office Action dated Apr. 6, 2005.

* cited by examiner

*Primary Examiner*—Anatoly Vortman
(74) *Attorney, Agent, or Firm*—KED & Associates, LLP

(57) ABSTRACT

A case for a mobile terminal is provided which allows for improved dissipation of heat generated by internal components. The improved case includes a first cover coupled to a second cover with a space formed therebetween to accommodate a heat generating portion of the mobile terminal. A heat discharging member is coupled to the second cover to discharge heat generated by the heat generating portion of the mobile terminal. In this manner, heat generated by internal components of the mobile terminal is effectively discharged, thus preventing product damage due to excessive heat, and enhancing system functionality and user convenience.

20 Claims, 5 Drawing Sheets

CASE OF MOBILE TERMINAL

BACKGROUND OF THE INVENTION

1. Field of the Invention

The present invention relates to a mobile terminal, and more particularly, to a case for a mobile terminal which has a heat discharging capability.

2. Background of the Related Art

Generally, heat is generated in a mobile terminal by a printed circuit board (PCB) installed in a case of the mobile terminal. More particularly, a power amplifier module (PAM) positioned at the PCB for amplifying transmission power and emitting the amplified transmission power through an antenna generates heat of approximately 80° C.

This heat is transmitted to the PCB, a key pad, and the case, thus degrading system functionality. Also, the product may be damaged due to repetitive temperature variances and differences in thermal expansion coefficients between components, and a peripheral temperature of the key pad may be increased, causing discomfort during use.

Moreover, the related art mobile terminal does not include a heat discharging means for discharging the heat generated by the PAM, and the case is formed of a synthetic resin material, which has weak heat discharging characteristics. Thus, a structure is required for discharging heat generated in the mobile terminal to reduce discomfort during use, to prevent product damage, and to enhance system functionality.

SUMMARY OF THE INVENTION

An object of the invention is to solve at least the above problems and/or disadvantages and to provide at least the advantages described hereinafter.

A case for a mobile terminal according to embodiments of the invention includes a heat discharging member which discharges heat generated by a heat generating portion of the mobile terminal. The heat discharging member may be coupled to a portion of the case and positioned so as to make contact with the heat generating portion of the mobile terminal so as to draw heat away from the heat generating portion and into the heat discharging member.

To achieve these and other advantages and in accordance with the purpose of the present invention, as embodied and broadly described herein, there is provided a case of a mobile terminal comprising: a first cover; a second cover coupled to the first cover and providing a space for accommodating a heat generating portion such as a printed circuit board, etc. between the first cover; and a heat discharging member integrally coupled to the second cover and discharging heat generated from the heat generating portion.

To further achieve these and other advantages and in accordance with the purpose of the present invention, as embodied and broadly described herein, there is provided a case for a mobile terminal, including a first cover, a second cover coupled to the first cover so as to form a space therebetween, and a heat discharging member coupled to the second cover and configured to discharge heat generated by a heat generating portion of the mobile terminal.

To further achieve these and other advantages and in accordance with the purpose of the present invention, as embodied and broadly described herein, there is provided a case for a mobile terminal, including a first cover, a second cover coupled to the first cover so as to form a space therebetween, wherein said space is configured to house a heat generating portion of the mobile terminal, and a heat discharging member disposed within said space and configured to draw heat generated by the heat generating portion of the mobile terminal into the heat discharging member.

The foregoing and other objects, features, aspects and advantages of the present invention will become more apparent from the following detailed description of the present invention when taken in conjunction with the accompanying drawings.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Figure 1:
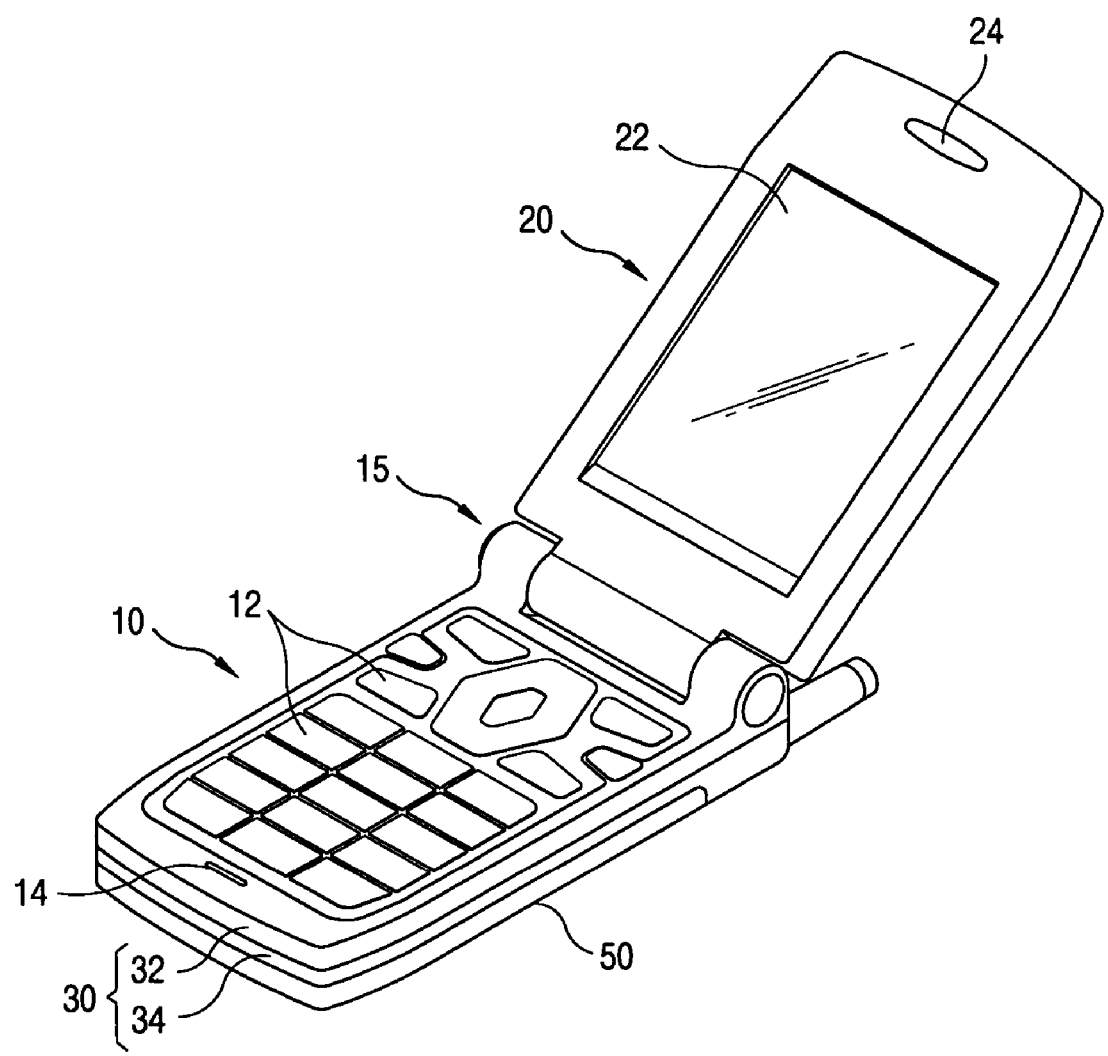
FIG. 1 is a perspective view of a mobile terminal in accordance with an embodiment of the invention.

As shown in FIG. 1, a mobile terminal in accordance with an embodiment of the invention includes a body 10 with a case 30 that forms an outer shell of the body 10, a plurality of keys 12 for inputting information, a microphone 14 for transmitting a voice signal, and a battery 50 removably attached to a rear side of the body 10 for supplying power. A folder 20 may be rotatably connected to the body 10 by a hinge portion 15, and may include a display panel 22 for displaying information, and a speaker 24 for receiving a voice signal.

Heat generated in the mobile terminal by a heat generating portion, such as, for example, a printed circuit board, installed in the case 30, may be dissipated by a heat discharging capability of the case 30. Embodiments of the case of the mobile terminal will now be explained.

Figure 2:
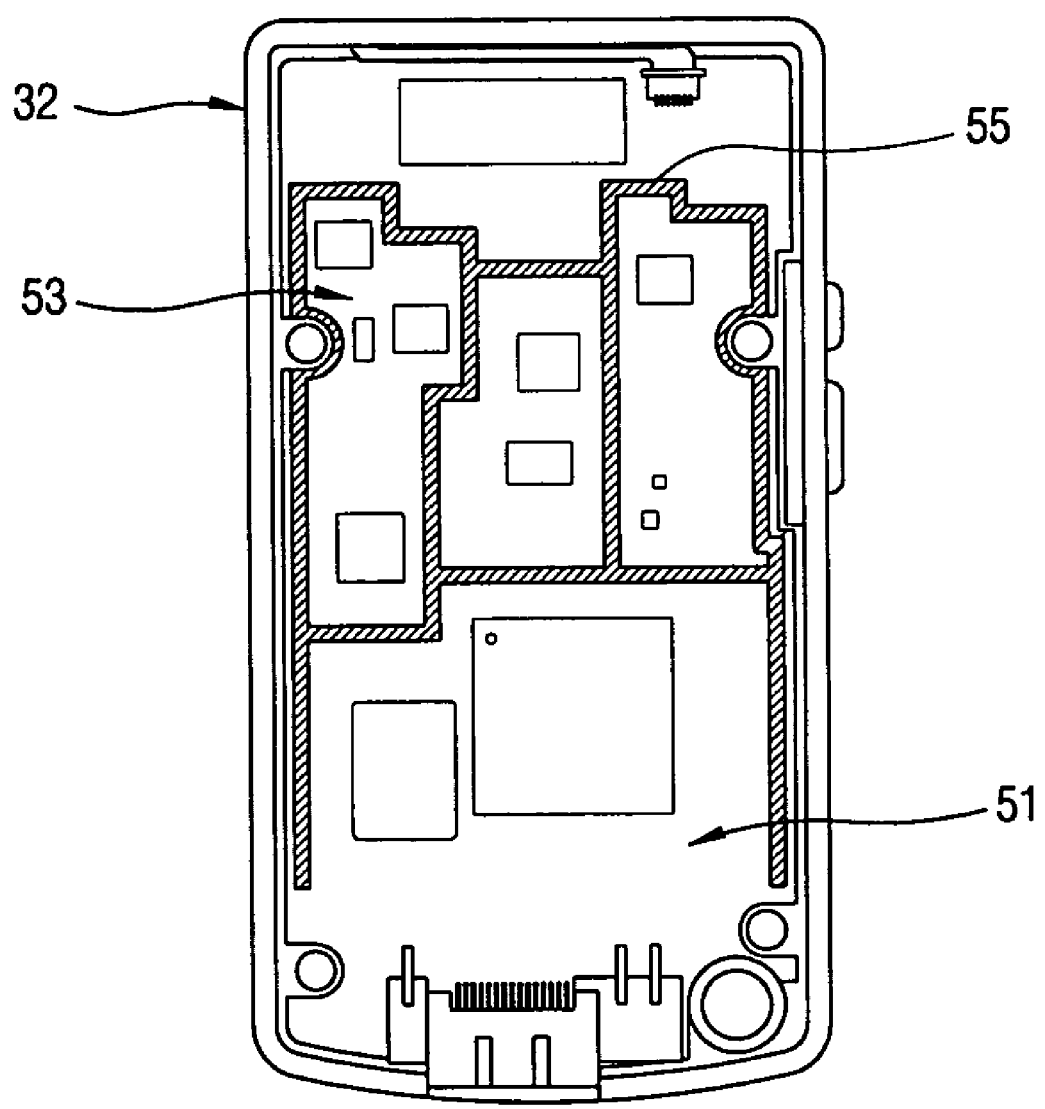
FIG. 2 is a schematic plan view of an inside of a case of a mobile terminal in accordance with an embodiment of the invention.
Figure 3:
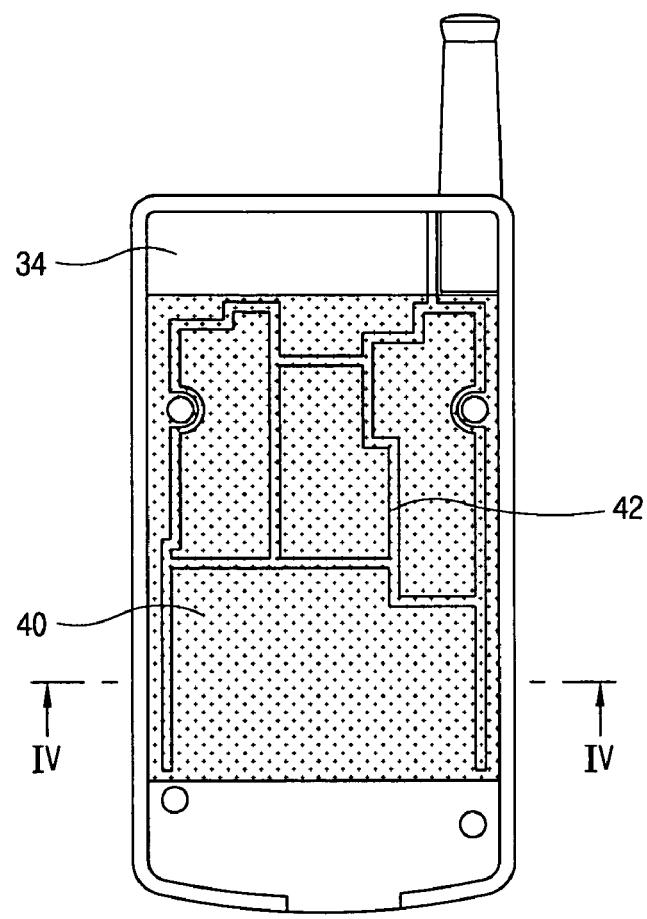
FIG. 3 is a plan view of a case of a mobile terminal in accordance with an embodiment of the invention.

As shown in FIGS. 2 and 3, the case 30 of the mobile terminal in accordance with embodiments of the invention includes a first cover 32 with a plurality of keys 12 provided on an outer surface thereof, and a second cover 34 coupled to the first cover 32 so as to form a space for accommodating various components of the mobile terminal, including, but not limited to a heat generating portion of the mobile terminal, such as, for example, a printed circuit board 51 installed in the space formed between the first cover 32 and the second cover 34. A heat discharging member 40 may be coupled to the second cover 34 to discharge heat generated by the heat generating portion.

The printed circuit board 51 may include a power amplifier module (PAM) 53 for amplifying transmission power and emitting the amplified transmission power. When the PAM 53 is operated, heat of approximately 80° C. is generated. The printed circuit board 51 may also include a ground pattern 55 for electrically connecting each component of the printed circuit board 51. The ground pattern 55 may be formed of a heat conductive material.

Figure 4:
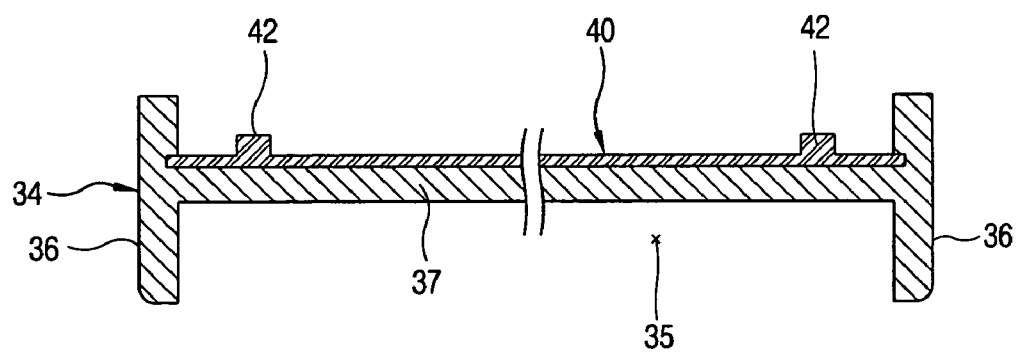
FIG. 4 is a sectional view of an embodiment of a case of a mobile terminal taken along line IV-IV of FIG. 3.

As shown in FIG. 4, the second cover 34 includes a concave battery accommodating portion 35 for accommodating the battery 50. The battery accommodating portion 35 includes a pair of lateral walls 36 separated by a partitioning wall 37 formed therebetween so as to covet the printed circuit board 51 positioned between the first and second covers 32 and 34, respectively.

The heat discharging member 40 may be coupled to the partitioning wall 37 of the second covet 34 in a variety of different ways. For example, the heat discharging member 40 may be adhered to a surface of the partitioning wall 37 of the second cover 34 facing the printed circuit board 51. A contact portion 42 formed on a surface of the heat discharging member 40 contacts the ground pattern 55 of the printed circuit board 51. The contact portion 42 may have a shape which corresponds to the shape of the ground pattern 55 to enhance heat discharging capability. The heat discharging member 40 may be made of a material such as, for example, a metal with a high level of heat conductivity. The heat discharging member 40 may be fabricated separately from the second cover 34, or the heat discharging member 40 may be integrally molded with the second cover 34.

When the mobile terminal is operated, high temperature heat is generated by the power amplifier module 53 on the printed circuit board 51, as well as by other components of the mobile terminal. This heat is transmitted to the ground pattern 55 of the printed circuit board 51, and the ground pattern 55 then transmits the heat to the heat discharging member 40 through the contact portion 42. The heat discharging member 40 serves as a heat sink by dissipating the heat transmitted thereto away from the affected components of the mobile terminal. In this manner, heat generated in the case 30 is easily discharged, and thus any effects due to an increase in temperature of the mobile terminal are reduced, product damage is prevented, and system functionality is enhanced.

Hereinafter, a case of a mobile terminal in accordance with another embodiment of the invention will be explained with reference to FIGS. 1-5, wherein like reference numerals refer to like components.

Figure 5:
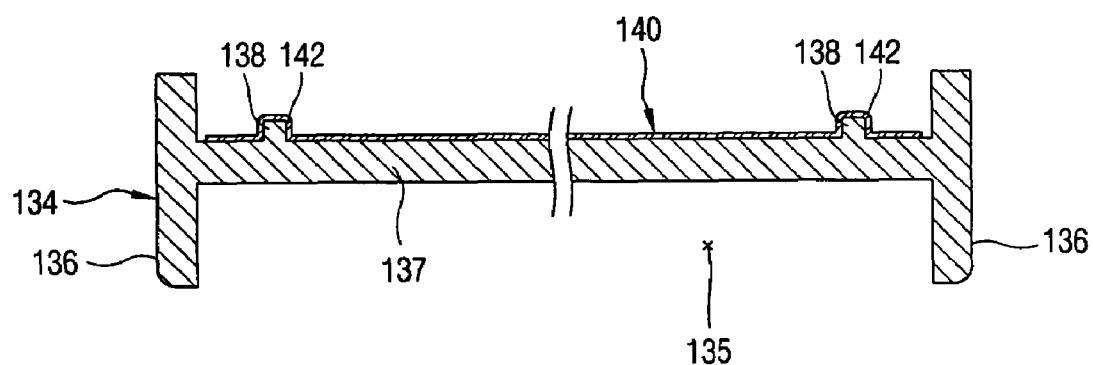
FIG. 5 is a sectional view of an embodiment of a case of a mobile terminal taken along line IV-IV of FIG. 3.

The case of the mobile terminal shown in FIG. 5 includes a first cover 32 with a plurality of keys 12 provided on an outer surface thereof, and a second cover 134 coupled to the first cover 32 so as to form a space for accommodating various components of the mobile terminal, including, but not limited to a heat generating portion such as, for example, a printed circuit board 51 installed in the space formed between the first cover 32 and the second cover 134. A heat discharging member 140 may be coupled to the second cover 134 to discharge heat generated by the heat generating portion of the mobile terminal.

As shown in FIG. 5, the second cover 134 includes a concave battery accommodating portion 135 for accommodating the battery 50. The battery accommodating portion 135 includes a pair of lateral walls 136 separated by a partitioning wall 137 formed therebetween so as to cover the printed circuit board 51 positioned between the first cover 32 and the second cover 134.

The heat discharging member 140 may have a thin plate shape, and may be made of a material with a high level of conductivity such as, for example, a metal. The heat discharging member 140 may be coupled to the partitioning wall 137 of the second cover 134 in a variety of different ways. For example, the heat discharging member 140 may be adhered to a surface of the partitioning wall 137 of the second cover 134 that faces the printed circuit board 51.

In order to establish contact between the heat discharging member 140 and the ground pattern 55 of the printed circuit board 51, the second cover 134 includes a protrusion portion 138. The protrusion portion 138 of the second cover 134 protrudes from a surface of the partitioning wall 137 that faces the printed circuit board 51 and may have a shape similar to the ground pattern 55. A contact portion 142 of the heat discharging member 140 is curved due to the shape of the protrusion portion 138, allowing the contact portion 142 to contact the ground pattern 55. The protrusion portion 138 and contact portion 142 may have a shape which corresponds to the shape of the ground pattern 55 to enhance heat discharging capability. The heat discharging member 140 may be integrally molded with the second covet 134.

Operation and effect of the case of the mobile terminal shown in FIG. 5 are essentially the same as the operation and effect of the case of the mobile terminal shown in FIG. 4.

Hereinafter, a case of a mobile terminal in accordance with another embodiment of the invention will be explained with reference to FIGS. 1-6, wherein like reference numerals refer to like components.

Figure 6:
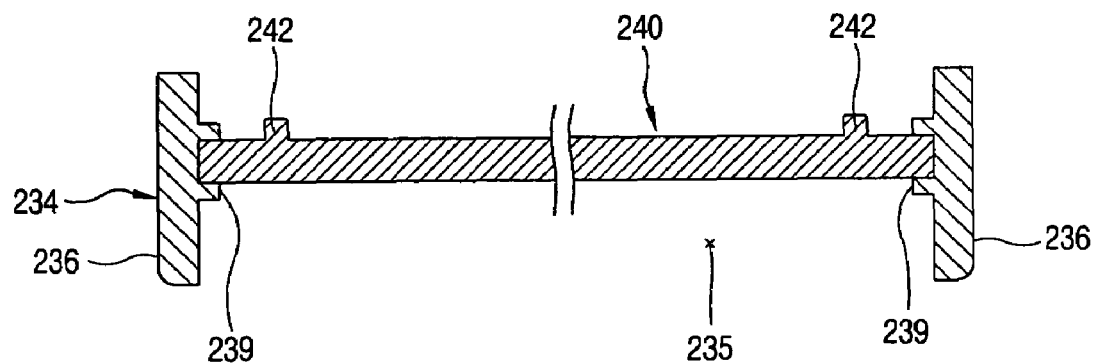
FIG. 6 is a sectional view of an embodiment of a case of a mobile terminal taken along IV-IV of FIG. 3.

The case of the mobile terminal shown in FIG. 6 includes a first cover 32 with a plurality of keys 12 provided on an outer surface thereof, and a second cover 234 coupled to the first cover 32. A heat discharging member 240 may be coupled to the second cover 234 so as to discharge heat generated by a heat generating portion of the mobile terminal.

As shown in FIG. 6, the second cover 234 includes an opening portion 239, and the heat discharging member 240 may be inserted into the opening portion 239 of the second cover 234. When inserted into the opening portion 239 of the second cover 234, the heat discharging member 240 and the first cover 32 form a space for accommodating a heat generating portion, such, for example, as a printed circuit board 51. The heat discharging member 240, together with a pair of lateral walls 236 of the second cover 234 also provides a battery accommodation portion 235 for accommodating a battery 50. A contact portion 242 protrudes from a surface of the heat discharging member 240 which faces the printed circuit board 51 so as to allow contact with a ground pattern 55 of the printed circuit board 51. The contact portion 242 may have a shape which corresponds to the shape of the ground pattern 55 to enhance heat discharging capability. The second cover 234 and the heat discharging member 240 may be integrally molded.

The heat discharging member 240 is inserted into and supported by the opening portion 239 formed in the lateral walls 236 of the second cover 234, and not by any type of partitioning wall extending between the pair of lateral walls 236. Thus, heat generated from the heat generating portion is not shielded by any type of partitioning walls such as the partitioning walls 37 and 137 shown in FIGS. 4 and 5. Rather, heat may be discharged directly outwardly, thereby further enhancing a heat discharging characteristic of the case.

Hereinafter, a case of a mobile terminal in accordance with another embodiment of the invention will be explained with reference to FIGS. 1-7, in which like reference numerals refer to like components.

Figure 7:
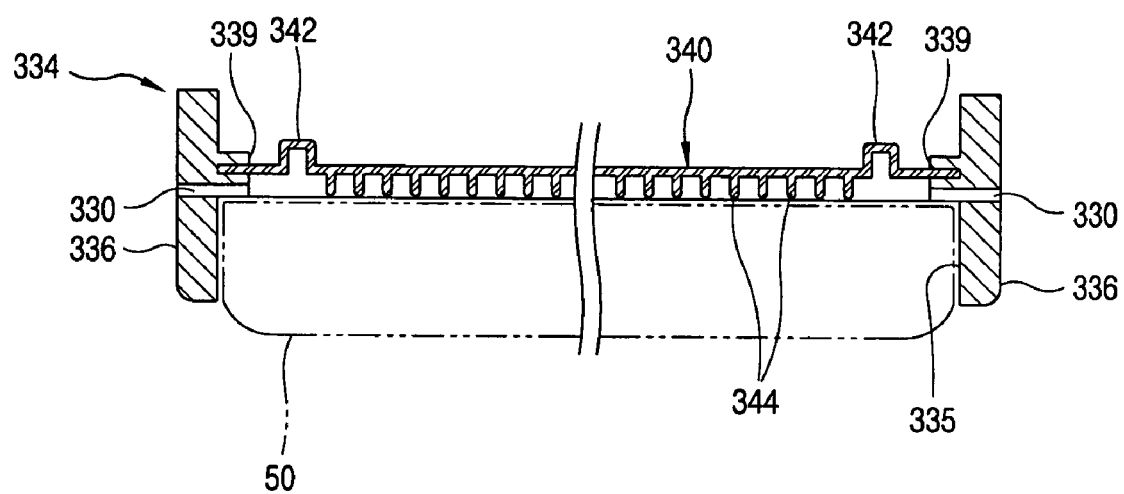
FIG. 7 is a sectional view of an embodiment of a case of a mobile terminal taken along line IV-IV of FIG. 3.

The case of the mobile terminal shown in FIG. 7 includes a first cover 32 with a plurality of keys 12 for inputting information provided on an outer surface thereof, and a second cover 334 coupled to the first cover 32. A heat discharging member 340 may be coupled to the second cover 334 so as to discharge heat generated by a heat generating portion of the mobile terminal.

The heat discharging member 340 is inserted into an opening portion 339 formed in the second cover 334 and, together with the first cover 32, forms a space for accommodating a heat generating portion such as, for example, a printed circuit board 51. The heat discharging member 340 and lateral walls 336 form a battery accommodation portion 335 for accommodating a battery 50. The heat discharging member 340 includes a contact portion 342 which protrudes from a surface of the heat discharging member 340 that faces the printed circuit board 51. The contact portion 342 of the heat discharging member 340 contacts a ground pattern 55 of the printed circuit board 51 when the heat discharging member 340 is inserted into the opening portion 339 of the second cover 334. The contact portion 342 may have a shape which corresponds to a shape of the ground pattern 55 to enhance heat discharging capability.

The heat discharging member 340 shown in FIG. 7 includes a plurality of heat discharging fins 344 in order to enhance heat discharging efficiency. A through hole 330 is formed in the lateral wall 336 of the second cover 334. The through hole 330 allows external air to enter into the space formed between the heat discharging member 340 and the battery 50, and more particularly, into the spaces formed at intervals along the length of the heat discharging member 340 by adjacent heat discharging fins 344. The external air that passes through the intervals formed between adjacent heat discharging fins 344 cools the heat discharging member 340. Thus, heat generated by heat generating portion of the mobile terminal is easily cooled, thereby enhancing system functionality and user convenience.

Features of the cases of the mobile terminals shown in FIGS. 4-7 may be combined with each other. Additionally, these cases may be used on a number of different types of mobile terminals, including, but not limited to a folder type terminal including a folder rotatably connected to a body, a bar type terminal, a flip type terminal, and a sliding cover type terminal.

The case for a mobile terminal according to embodiments of the invention as broadly described herein is capable of enhancing a system functionality and effectively discharging heat generated by a heat generating portion of the mobile terminal, such as, for example, a printed circuit board or a power amplifier module.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art In the claims, means-plus-function clauses are intended to cover the structures described herein as performing the recited function and not only structural equivalents but also equivalent structures.

What is claimed is:

1. A case for a mobile terminal, comprising:
a first cover;
a second cover coupled to the first cover so as to form a space therebetween, wherein the second cover comprises a partitioning wall configured to extend across an exposed space of the first cover; and
a heat discharging member coupled to the second cover and configured to discharge heat generated by a heat generating portion of the mobile terminal, wherein the heat discharging member is configured to be positioned on a surface of the partitioning wall which faces the heat generating portion.

2. The case of claim 1, wherein the heat generating portion comprises a printed circuit board configured to be installed in the space formed between the first and second covers.

3. The case of claim 2, wherein the heat discharging member comprises a contact portion configured to extend from a surface of the heat discharging member towards the printed circuit board, and to contact a ground pattern formed on the printed circuit board.

4. The case of claim 1, wherein the heat discharging member is integrally molded with the second cover.

5. The case of claim 2, wherein the heat discharging member is configured to be adhered to a surface of the partitioning wall which faces the printed circuit board.

6. The case of claim 5, wherein the partitioning wall comprises a protrusion portion which protrudes from a surface of the partitioning wall, and wherein the heat discharging member comprises a thin plate that substantially conforms to the partitioning wall and the protrusion portion.

7. The case of claim 6, wherein the protrusion portion protrudes from a surface of the partitioning wall which faces the printed circuit board.

8. The case of claim 7, wherein a shape of the protrusion portion of the partitioning wall corresponds to a shape of a ground pattern formed on the printed circuit board.

9. The case of claim 8, wherein the portion of heat discharging member which is formed on the protrusion portion of the partitioning wall is configured to contact the ground pattern of the printed circuit board.

10. The case of claim 1, wherein the heat discharging member is physically coupled to the second cover and thermally coupled to the heat generating portion of the mobile terminal.

11. A mobile terminal comprising the case of claim 1.

12. A case for a mobile terminal, comprising:
a first cover;
a second cover coupled to the first cover so as to form a space therebetween, wherein said space is configured to house a heat generating portion of the mobile terminal, and wherein the second cover comprises a pair of lateral walls and a partitioning wall extending at least partially therebetween; and
a heat discharging member disposed within said space and configured to draw heat generated by the heat generating portion of the mobile terminal into the heat discharging member, wherein the heat discharging member is disposed on a portion of the partition wall that faces the heat generating portion.

13. The case of claim 12, wherein the heat generating portion comprises a printed circuit board installed in said space formed between the first and second covers.

14. The case of claim 13, wherein the partitioning wall has a first end coupled to a first of the pair of lateral walls and a second end coupled to a second of the pair of lateral walls so as to extend continuously therebetween, and wherein the heat discharging member is coupled to a surface of the partitioning wall which faces the printed circuit board.

15. The case of claim 14, wherein the heat discharging member comprises a contact portion which protrudes from a surface of the heat discharging member toward the printed circuit board.

16. The case of claim 15, wherein the contact portion has a shape corresponding to a shape of a ground pattern formed on the printed circuit board, and wherein the contact portion is configured to contact the ground pattern so as to form a thermal connection therebetween.

17. The case of claim 14, wherein the partitioning wall comprises a protrusion portion which extends from a surface of the partitioning wall in the direction of the printed circuit board, and wherein the heat discharging member conforms to the surface of the partitioning wall.

18. The case of claim 17, wherein the portion of the heat discharging member which conforms to the protrusion portion of the partitioning wall forms a contact portion, and wherein the contact portion has a shape corresponding to a shape of a ground pattern formed on the printed circuit board, and wherein the contact portion is configured to contact the ground pattern so as to form a thermal connection therebetween.

19. The case of claim 12, wherein the heat discharging member is physically coupled to the second cover, and thermally coupled to the heat generating portion of the mobile terminal.

20. A mobile terminal comprising the case of claim 12.

* * * * *